US006499798B2

(12) United States Patent
Takemoto

(10) Patent No.: US 6,499,798 B2
(45) Date of Patent: Dec. 31, 2002

(54) VEHICLE BODY STRUCTURE

(75) Inventor: Yorito Takemoto, Okazaki (JP)

(73) Assignee: Mitsubishi Jidosha Kogyo Kabushiki Kaisha (JP)

( * ) Notice: Subject to any disclaimer, the term of this patent is extended or adjusted under 35 U.S.C. 154(b) by 0 days.

(21) Appl. No.: 09/981,307

(22) Filed: Oct. 17, 2001

(65) Prior Publication Data
US 2002/0074830 A1 Jun. 20, 2002

(30) Foreign Application Priority Data
Oct. 17, 2000 (JP) ........................................ 2000-316709

(51) Int. Cl.[7] .................................................. B60J 7/00
(52) U.S. Cl. .................. 296/203.02; 296/205; 296/188; 296/189
(58) Field of Search ................................ 296/189, 188, 296/194, 203.02, 205

(56) References Cited

U.S. PATENT DOCUMENTS

| 5,048,888 | A | * | 9/1991 | Willy et al. ................. 296/189 |
| 5,855,394 | A |   | 1/1999 | Horton et al. ............... 280/781 |
| 5,868,457 | A |   | 2/1999 | Kitagawa .................... 296/188 |
| 5,913,565 | A |   | 6/1999 | Watanabe .................... 296/189 |
| 6,068,330 | A | * | 5/2000 | Kasuga et al. ............... 296/189 |
| 6,170,906 | B1 |  | 1/2001 | Kasuga ....................... 296/203.02 |
| 6,227,610 | B1 |  | 5/2001 | Iwatsuki et al. ............. 296/204 |
| 6,293,587 | B1 |  | 9/2001 | Lapic et al. ................. 280/784 |
| 6,382,709 | B1 | * | 5/2002 | Chirifu et al. .............. 296/189 |
| 6,409,239 | B1 |  | 6/2002 | Tjoelker et al. ............ 293/133 |
| 6,409,253 | B2 |  | 6/2002 | Larsson et al. ............. 296/188 |
| 2001/0038231 | A1 | * | 11/2001 | Takenmoto et al. ......... 296/189 |

* cited by examiner

*Primary Examiner*—Joseph D. Pape
(74) *Attorney, Agent, or Firm*—Rossi & Associates

(57) ABSTRACT

A front side member extending in the longitudinal direction of a vehicle is comprised of a kick up portion, and a cylindrical front side member body with an octagonal sectional form extending from the front end to the rear end in front of the kick up portion. The kick up portion and the front side member body are integrated together by joining an inner member and an outer member. The respective portions of the inner member and the outer member between the kick up portion and the front side member are concaved to be in contact with each other, and are welded together to form a joint. A first closed section is formed at the upper side of the joint, and a second closed section is formed at the lower side of the joint. The result realizes a vehicle body structure having a lightweight front side member with an improved impact resistance and a high energy absorbing efficiency.

4 Claims, 4 Drawing Sheets

VEHICLE BODY STRUCTURE

FIELD OF THE INVENTION

The invention relates to a vehicle body structure that constitutes a part of the body of a vehicle or the like.

BACKGROUND OF THE INVENTION

A side member constituting a part of the body of a vehicle or the like is comprised of, for example, a floor side member 1 that extends along the longitudinal side of a floor portion of the vehicle and a front side member 2 that is positioned in front of the floor side member 1 as shown in FIG. 5. The front side member 2 is comprised of a kick up portion 3 that rises up from the front end of the floor side member 1, a front side member body 4 that extends forward from the kick up portion 3, and so forth. The front side member 2 in FIG. 5 is substantially straight in the longitudinal direction if viewed from above, and the front side member 2 has a high energy absorbing efficiency in inhibiting the deformation of the vehicle body in offset impact.

In the above-mentioned front side member 2, a flat area 5 that is relatively wide in the vertical direction is formed at the side including a boundary between the kick up portion 3 and the front side member body 4. In the case of a vehicle crash, the impact resistance of the kick up portion 3 must be increased to improve the energy absorbing efficiency of the front side member body 4. As there is the need for inhibiting the deformation of the flat area 5, the kick up portion 3 is provided with partition-shaped bulkheads 6, 7 functioning as reinforcing materials in order to increase the impact resistance of the kick up portion 3. If, however, the bulkheads 6, 7 are provided in order to inhibit the deformation of the kick up portion 3, the weight of the front side member 2 is increased.

In view of the above, it would therefore be desirable to provide a vehicle body structure that is capable of improving the impact resistance of a kick up portion without using any bulkheads to thus reduce the weight of a front side member.

SUMMARY OF THE INVENTION

According to the present invention, a front side member has a front side member body that is shaped like a cylinder having a substantially octagonal sectional form extending from the front end to the rear end is disposed at the side of an engine room in a vehicle, thereby improving energy absorbing efficiency. A pair of an inner member and an outer member constituting the front side member body and a kick up portion are joined together at a joint where a portion at the rear end of said front side member body and a portion at the front end of said kick up portion are concaved to be in contact with each other and are joined together, and thus a first closed section is formed at an upper side of the joint and a second closed section is formed at a lower side of the joint. This improves the impact resistance of the kick up portion. Moreover, the respective ridge lines of the front side member body having the octagonal sectional form are continuously formed from the front end to the rear end of the front side member body, and this further improves the energy absorbing efficiency. Further, the portions between the kick up portion and the front side member body are joined together to form the upper first closed section and the lower second closed section. This improves the impact resistance of the kick up portion without using any bulkheads to achieve the satisfactory energy absorbing efficiency of the front side member body and reduce the weight of the front side member body.

BRIEF DESCRIPTION OF THE DRAWINGS

The invention will be described with reference to the accompanying drawings, in which like reference characters designate the same or similar parts throughout the figures and wherein.

DETAILED DESCRIPTION OF THE PREFERRED EMBODIMENTS

Figure 1:
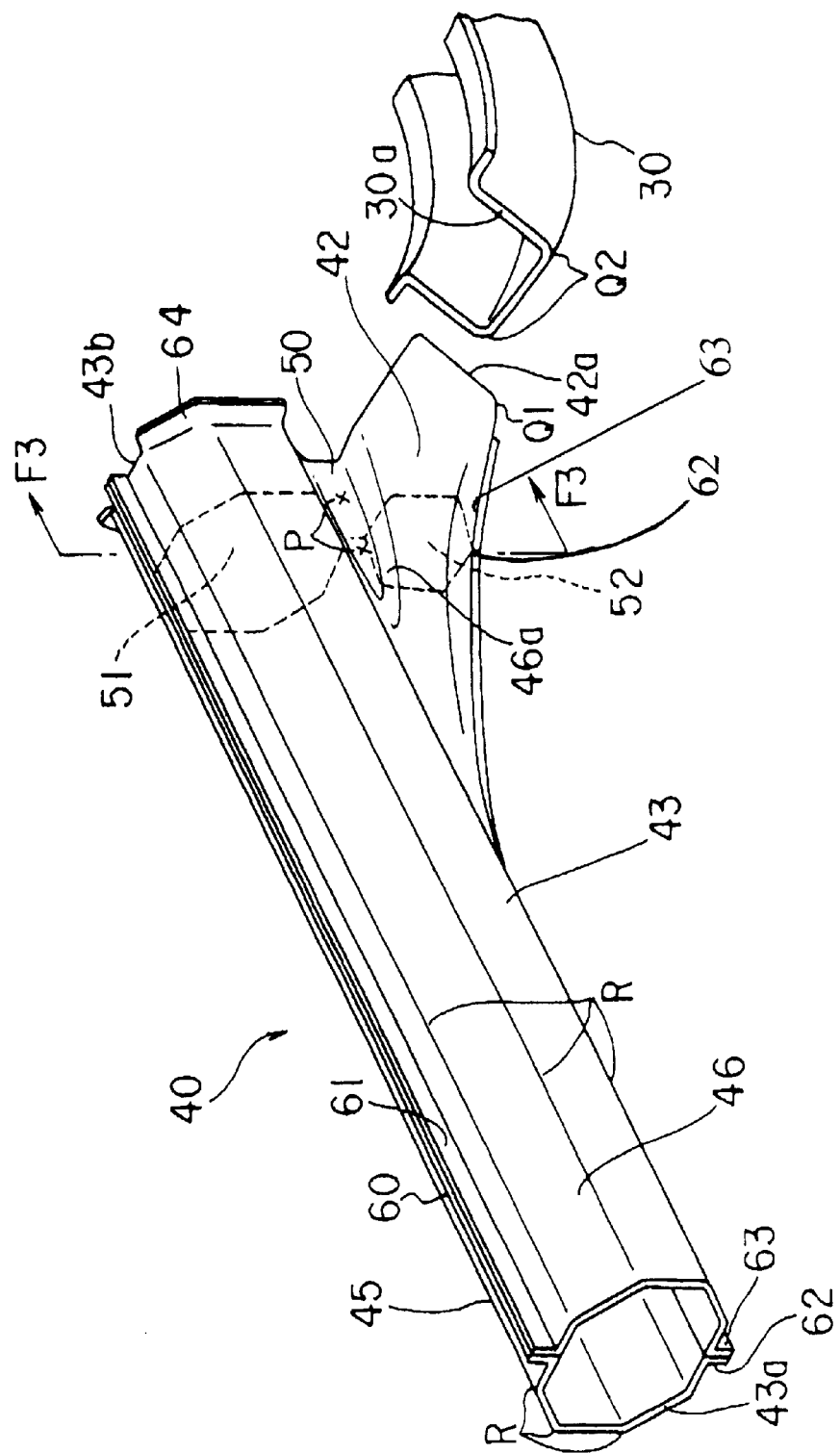
FIG. 1 is a perspective view showing a front side member according to the first embodiment of the present invention.
Figure 2:
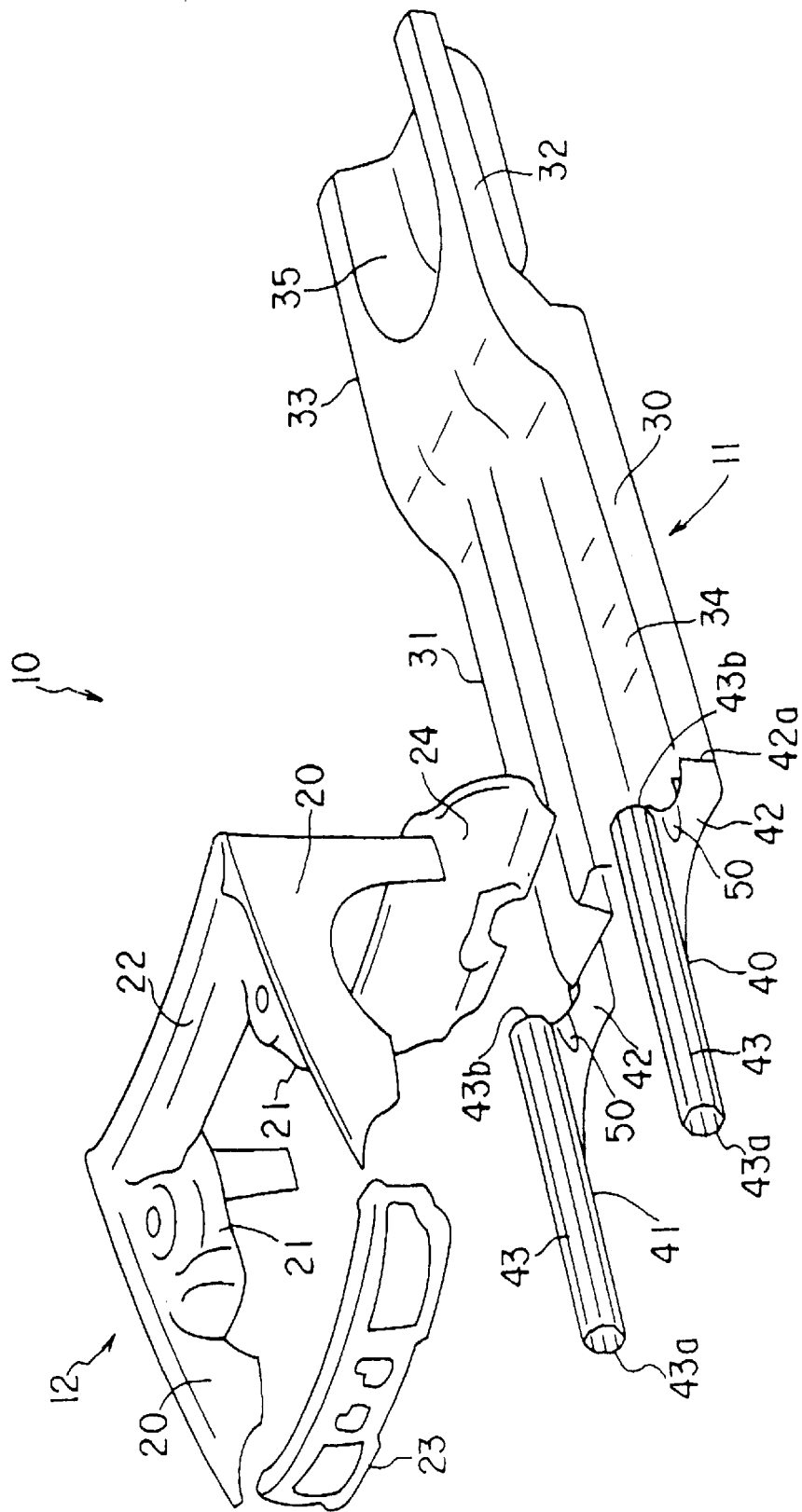
FIG. 2 is a perspective view showing a vehicle body having the front side member shown in FIG. 1.

A first embodiment of the present invention will now be described with reference to FIG. 1 to FIG. 3. A vehicle body 10 in FIG. 2 is comprised of a lower frame structure 11 constituting a lower structure of the vehicle body 10, an upper frame structure 12 constituting an upper front structure of the vehicle body 10, and so forth. The upper frame structure 12 in FIG. 2 is comprised of steel members such as a pair of right and left fender members 20, a spring house panel 21, a cowl top panel 22, a head lamp support member 23, and a dash panel 24. The lower frame structure 11 includes steel members such as a pair of right and left floor side members 30, 31 extending in the longitudinal direction of a vehicle; rear floor side members 32, 33 formed continuously from the back of the floor side members 30, 31; a front floor pan 34 provided between the floor side members 30, 31; a rear floor pan 35 provided between the rear floor side member 32, 33; and front side members 40, 41 provided in front of the floor side members 30, 31. The floor side members 30, 31 constitute the frame of a floor portion in the vehicle.

The right and left front side members 40, 41 are symmetrical with each other and have substantially the same structure, and therefore, the front side member 40 will only be described below. The front side member 40 is substantially straight in the longitudinal direction if viewed from above the vehicle body, and is comprised of a kick up portion 42 that rises up from a front end 30a of the floor side member 30 and a cylindrical front side member body 43 extending forward from the kick up portion 42. The front side member body 43 is disposed at the side of an engine room in the vehicle.

Figure 3:
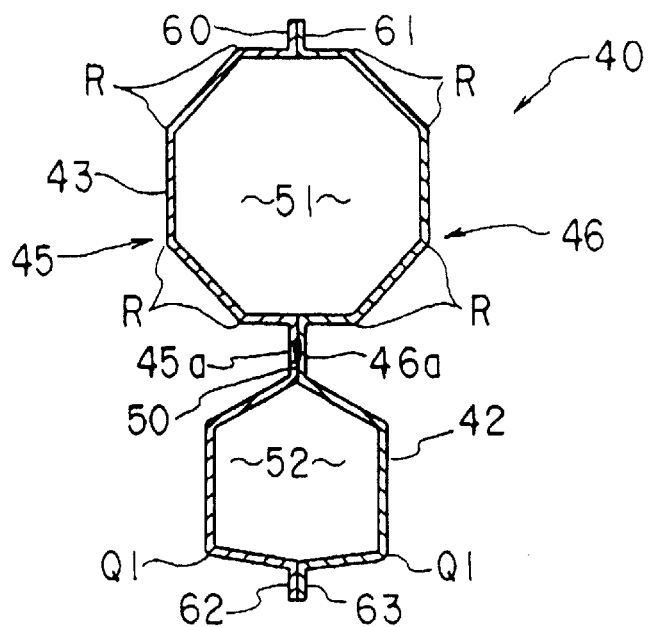
FIG. 3 is a sectional view showing the front side member along line F3—F3 in FIG. 1.

The kick up portion 42 and the front side member body 43 are formed by joining a pair of a left inner member 45 and a right outer member 46 by welding as shown in FIG. 3. The inner member 45 is positioned to directed to the inside of the vehicle body 10, and the outer body 46 is positioned to be directed to the outside of the vehicle body 10 compared with the inner member 45.

The front side member body 43 is formed to have continuous eight ridge lines R from the front end 43a to the rear end 43b thereof, that is, the front side member body 43 is shaped like a cylinder having a substantially octagonal sectional form. The front side member body 43 having the octagonal section with the eight ridge lines R exhibits the preferable buckling characteristics when receiving the impact in the crash of the vehicle or the like, and has a higher impact energy absorbing efficiency than a front side member that is shaped like a cylinder having a round or square sectional form. The kick up portion 42 extends toward the rear end 43*b* of the front side member body 43 while uprising.

As shown in FIG. 3, the respective portions of the inner member 45 and the outer member 46 between the kick up portion 42 and the front side member body 43, i.e., vertical intermediate portions 45*a*, 46*a*, are concaved to be in contact with each another and are butted together by spot welding to thus form a joint 50. Reference P in FIG. 1 denotes an example of the welded portion. A first closed section 51 is formed at the upper side of the joint 50, and a second closed section 52 is formed at the lower side of the joint 50. A portion of these closed sections 51, 52 substantially forms a figure-eight cross-sectional shape, i.e., two substantially tubular sections joined together, but spaced apart by the intermediate portions. A lower ridge line Q1 of the second closed section 52 connects with a lower ridge line Q2 (see FIG. 1) of the floor side member 30.

The kick up portion 42 has a high impact resistance since the kick up portion 42 and the front side member body 43 are formed to have the above-mentioned sectional forms. Moreover, the front side member body 43 has a high energy absorbing efficiency since the eight ridge lines R of the octagonal section are continuously formed from the front end 43*a* of the front side member body 43 up to the dash panel 24.

Upper flanges 60, 61 are formed along the respective top ridge lines of the inner member 45 and the outer member 46 and are integrated together by spot welding using conventional sport welding equipment so that the inner member 45 and the outer member 46 can be connected with each other. These upper flanges 60, 61 are welded to the spring house panel 21 or the like. Lower flanges 62, 63 are formed along the respective lower ridge lines of the inner member 45 and the outer member 46 and are integrated together by spot welding using conventional sport welding equipment so that the inner member 45 and the outer member 46 can be connected with each other.

Further, a flange 64 is formed at the rear end 43*b* of the front side member body 43, and is spot-welded to the dash panel 24 or the like. The rear end 42*a* of the kick up portion 42 is welded to the front end 30*a* of the front side member 30.

Figure 4:
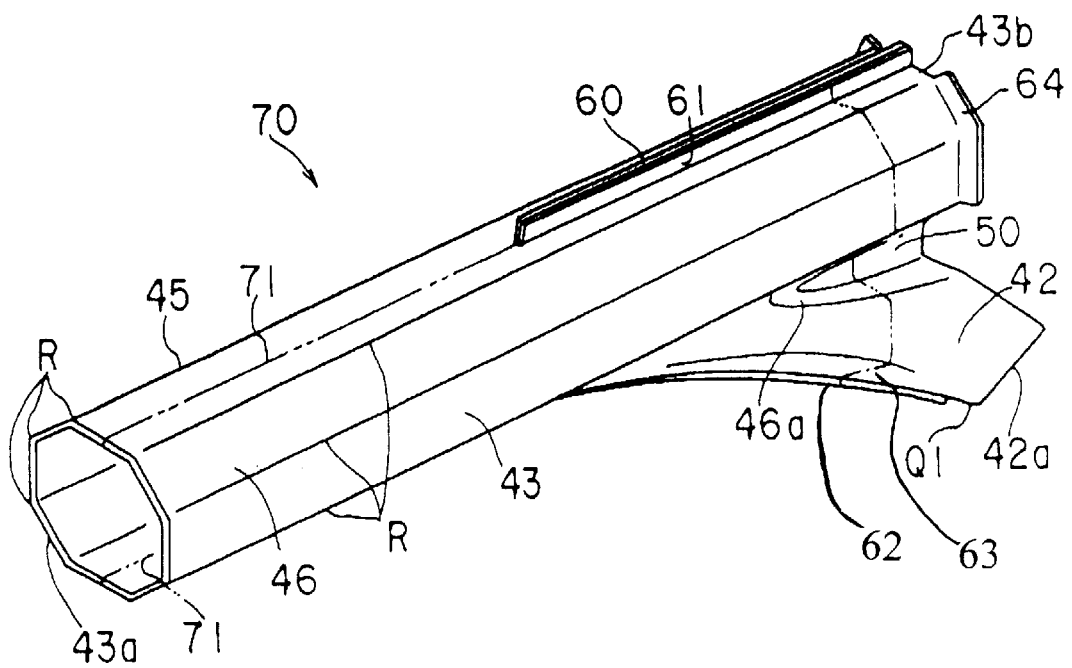
FIG. 4 is a perspective view showing a front side member according to the second embodiment of the present invention.
Figure 5:
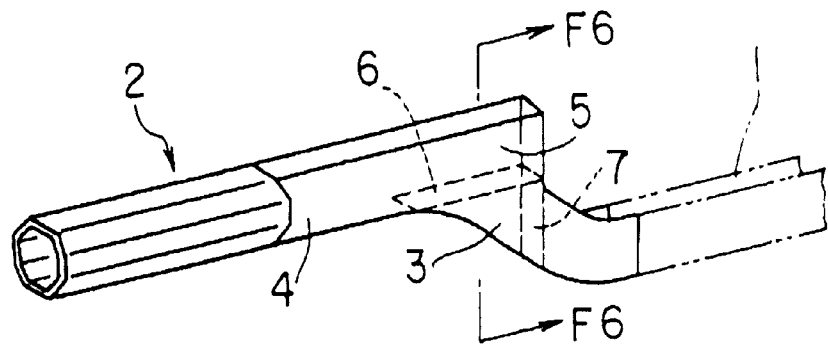
FIG. 5 is a perspective view showing a conventional front side member.
Figure 6:
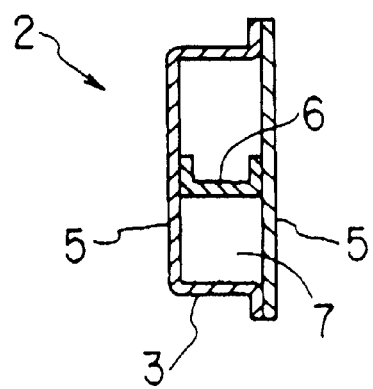
FIG. 6 is a sectional view showing the front side member along line F6—F6 in FIG. 5.

FIG. 4 illustrates a front side member 70 according to the second embodiment. In the front side member body 43 according to this embodiment, the inner member 45 and the outer member 46 are joined together over a predetermined length from the front end 43*a* by continuous welding 71 such as laser welding. The continuous welding 71 stabilizes the deforming behaviors (buckling characteristics) of the front side member body 43 during a crash of the vehicle compared with the case where the flanges are joined together by sport welding. Except that, the front side member 70 has the same structure as the front side member 40 according to the first embodiment. Therefore, the common parts are denoted by the same reference numerals and a description thereof is omitted here.

As shown in FIG. 4, according to the second embodiment, in an area extending from the middle of the front side member body portion 43 to the rear end 43*b* of the front side member body 43, the upper flanges 60, 61 and the lower flanges 62, 63 are formed in the same manner as in the first embodiment. These flanges are joined together by spot welding or the like, and the upper flanges 60, 61 are welded to the spring house panel 21 (see FIG. 2) or the like. It should be noted that the front side member body 43 may be welded in the overall length from the front end 43*a* to the rear end 43*b* by continuous welding 71 such as laser welding.

It should be understood, however, that the invention is to cover all modifications of the respective components constituting the present invention such as the kick up portion, the front side member body, the inner member, the outer member, the joint, the first closed section, the second closed section, etc. of the front side member. Further, the inner member and the outer member may be connected at the joint in any methods other than sport welding insofar as they can be connected at the joint.

What is claimed is:

1. A vehicle body structure having a front side member in a longitudinal direction of a vehicle, wherein said front side member comprising:

a cylindrical front side member body disposed at a side of an engine compartment of the vehicle, wherein the cylindrical front side member body comprises a substantially octagonal sectional form extending from a front end to a rear end;

a kick up portion extending from a front end of a floor side member constituting a frame of a floor portion of the vehicle toward a rear end of said front side member body while rising upward;

wherein said front side member body and said kick up portion are integrated together by joining an inner member and an outer member; and wherein the inner member and the outer member are joined together at a joint where a portion at the rear end of said front side member body and a portion at the front end of said kick up portion are concaved to be in contact with each other and are joined together, so that a first closed section is formed at an upper side of the joint and a second closed section is formed at a lower side of the joint.

2. A vehicle body structure according to claim 1, wherein the inner member and the outer member are provided such that a portion thereof, including the first closed section, the joint, and the second closed section, substantially forms a figure-eight cross-sectional shape, and wherein the second closed section is provided such that a lower ridge line thereof connects with a lower ridge line of the floor side member.

3. A vehicle body structure according to claim 1, wherein respective upper flanges provided along respective upper edges of the inner member and the outer member are joined together by spot welding, and respective lower flanges provided along respective lower edges of the inner member and the outer member are joined together by spot welding, and wherein the inner member and the outer member are joined together at the joint by spot welding.

4. A vehicle body structure according to claim 3, wherein respective portions of the inner member and the outer member in proximity to the front end of said front side member body are joined together by continuous welding.

* * * * *

UNITED STATES PATENT AND TRADEMARK OFFICE
CERTIFICATE OF CORRECTION

PATENT NO.    : 6,499,798 B2
DATED         : December 31, 2002
INVENTOR(S)   : Takemoto et al.

It is certified that error appears in the above-identified patent and that said Letters Patent is hereby corrected as shown below:

<u>Title page,</u>
Item [75], Inventors, please insert -- Kunio Takaoka, Okazaki-shi, Japan --.

Signed and Sealed this

Twenty-second Day of April, 2003

JAMES E. ROGAN
*Director of the United States Patent and Trademark Office*